Aug. 11, 1953 R. C. RAYMOND 2,648,838
INDICATING AND RECORDING SYSTEMS
Filed July 27, 1949 6 Sheets-Sheet 1
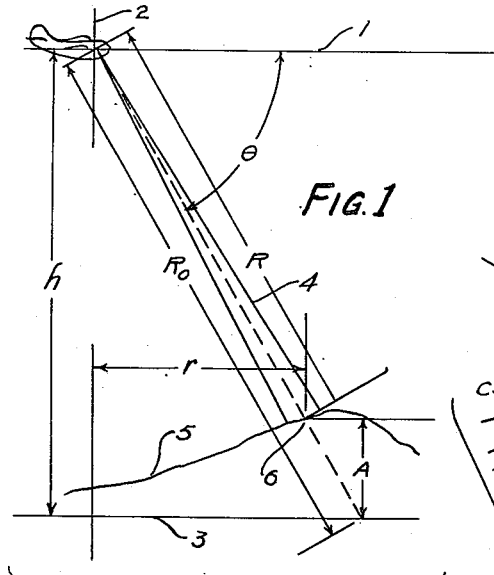
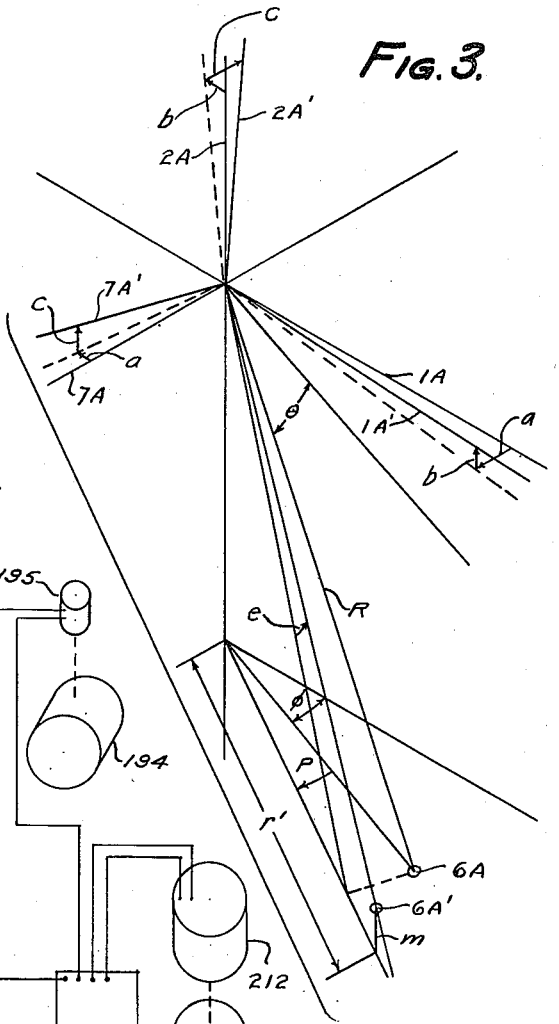
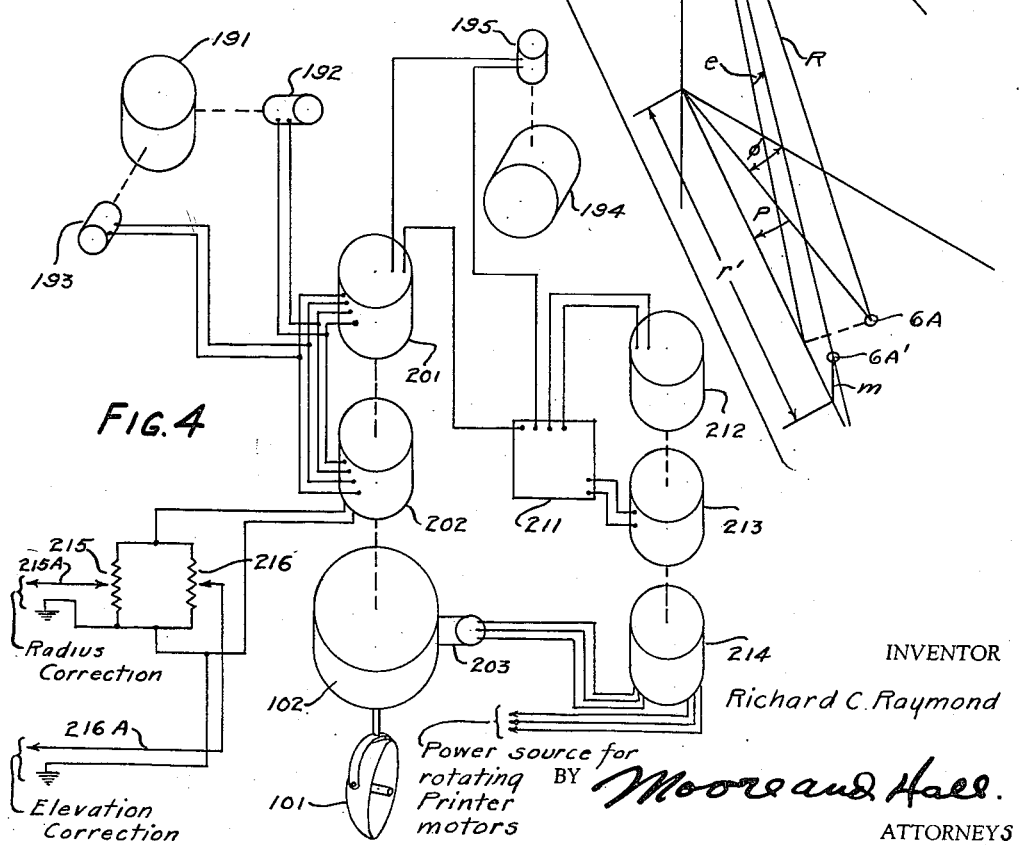
INVENTOR
Richard C. Raymond
BY Moore and Hall.
ATTORNEYS

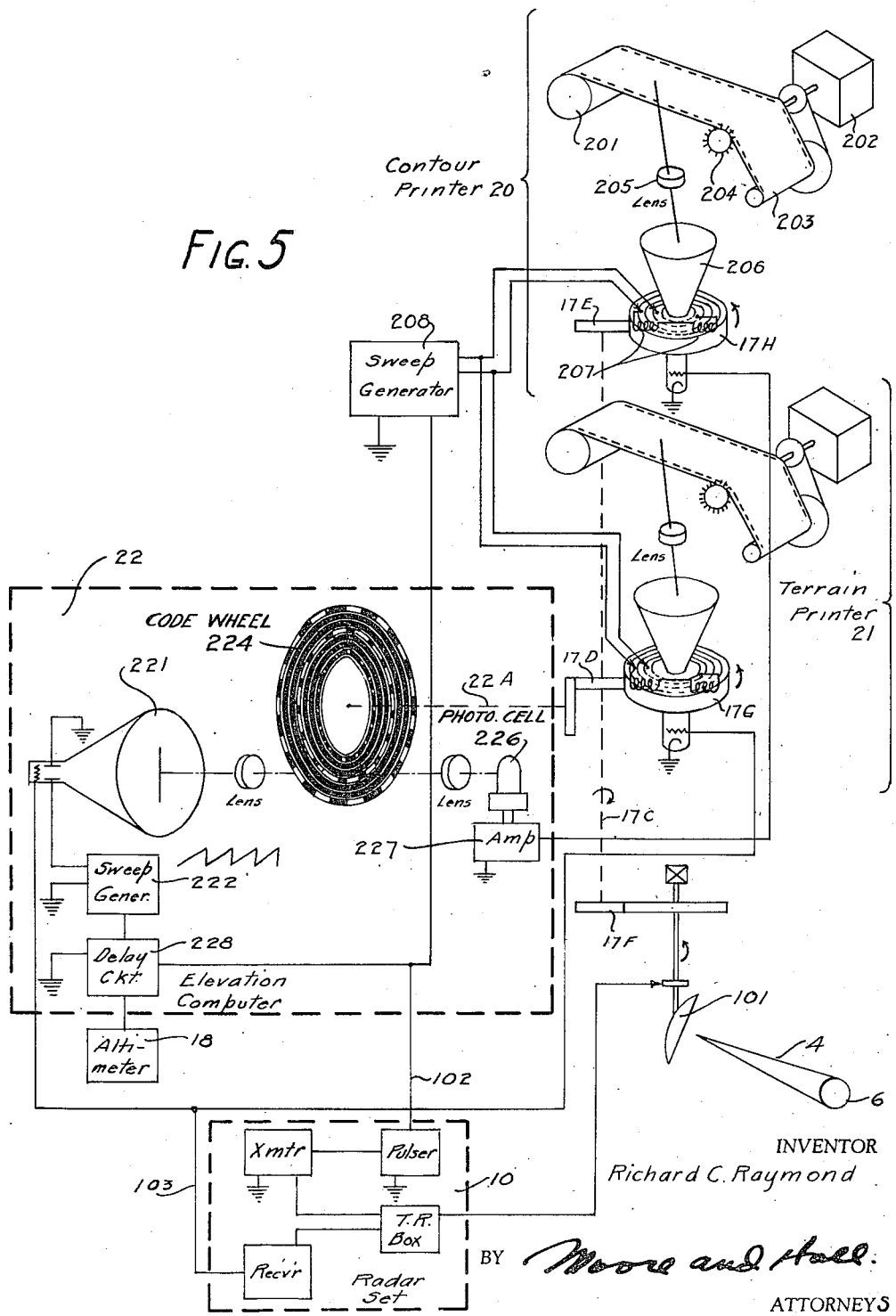

Aug. 11, 1953
R. C. RAYMOND
2,648,838
INDICATING AND RECORDING SYSTEMS
Filed July 27, 1949
6 Sheets-Sheet 4
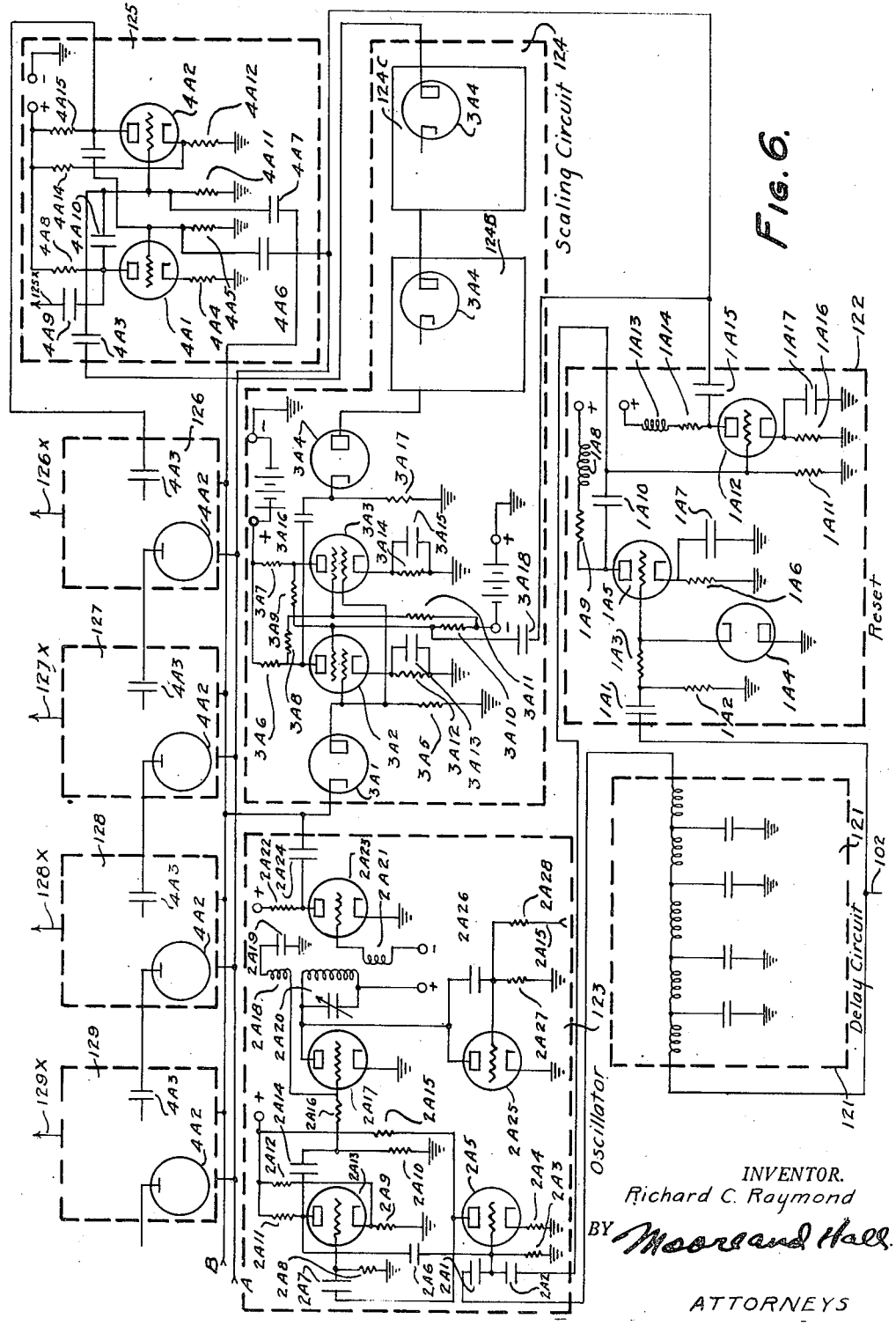
INVENTOR.
Richard C. Raymond
BY Moore and Hall
ATTORNEYS INVENTOR
Richard C. Raymond Aug. 11, 1953  R. C. RAYMOND  2,648,838
INDICATING AND RECORDING SYSTEMS
Filed July 27, 1949  6 Sheets—Sheet 6
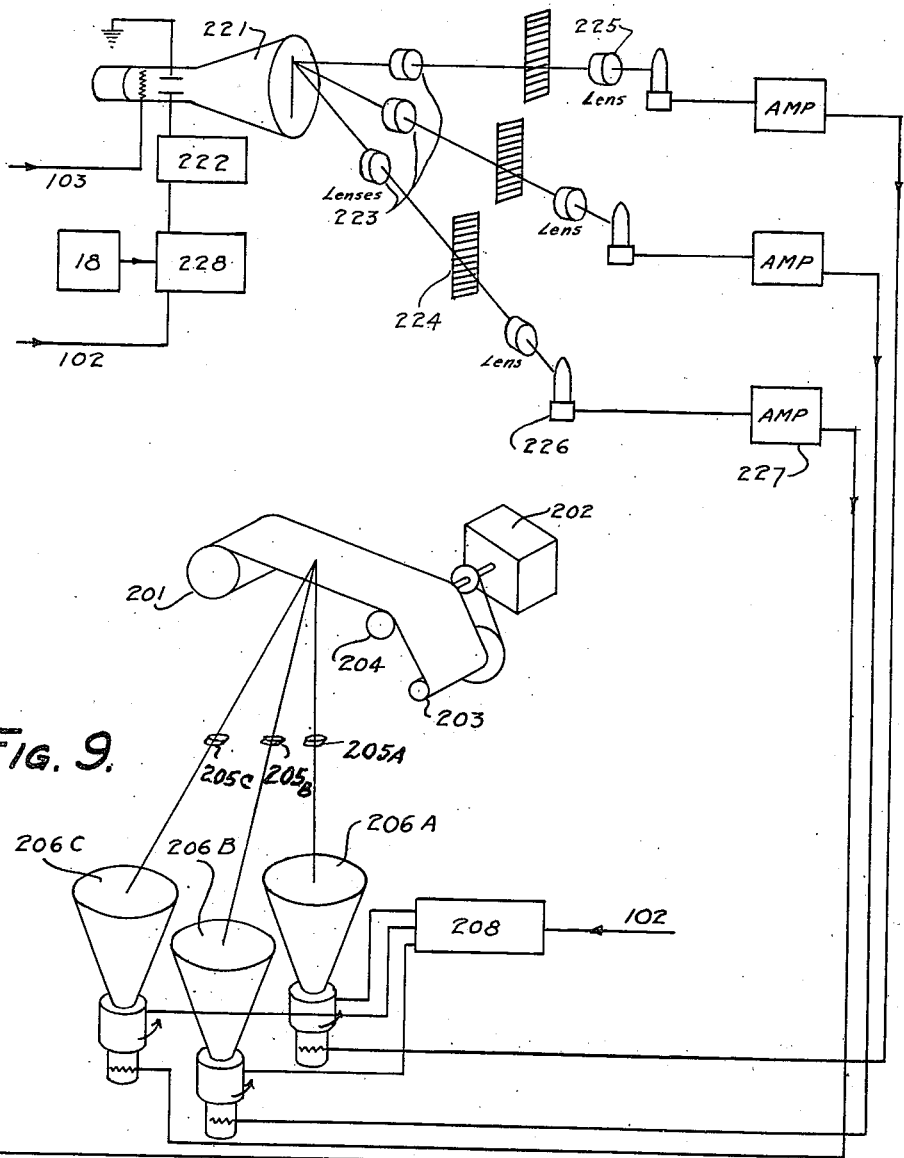
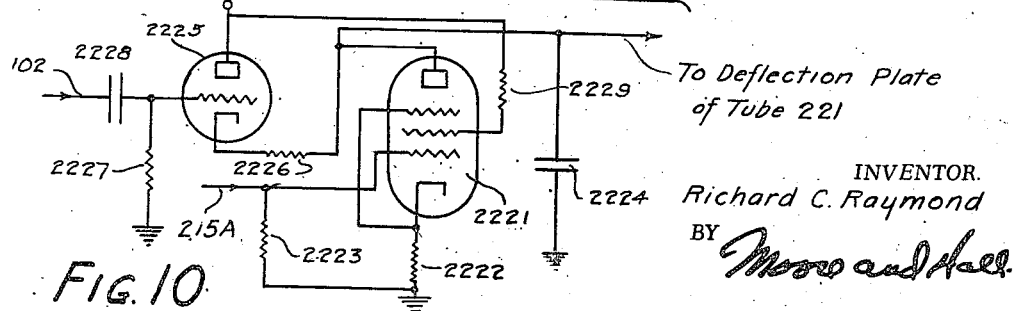
To Deflection Plate of Tube 221
INVENTOR.
Richard C. Raymond
BY
ATTORNEYS Patented Aug. 11, 1953

2,648,838

UNITED STATES PATENT OFFICE 2,648,838

INDICATING AND RECORDING SYSTEMS

Richard C. Raymond, State College, Pa., assignor to Haller, Raymond and Brown, Inc., State College, Pa., a corporation Application July 27, 1949, Serial No. 107,005

21 Claims. (Cl. 343—11)

This invention relates to indicating and recording systems and has for its primary object the provisions of means for indicating and/or printing the output of a radar set in an improved manner. A more specific object is to provide a system adapted to be used aboard an aircraft for printing contour lines. Various other objects and advantages will appear as this description proceeds.

One of the specific forms of the invention herein described contemplates a device for use aboard an aircraft for printing a map of the terrain and also for printing another map the only indicia on which consist of contour lines. The apparatus employed aboard the aircraft includes a radar set and two printers one of which prints a map according to the output of the radar set. The other printer is a contour line printer and is responsive to the output of the radar set. It has an input circuit that feeds impulses thereto only when the impulses correspond to contour lines. If desired the input circuit to the contour printer can be modified by a barometric altimeter to correct for variations in the altitude of the aircraft. Other means are employed to correct for variations in the angular position of the aircraft.

A detailed description follows, and the novel features are set forth in the appended claims.

In the drawings:

Figure 1 is a diagram useful in explaining the invention.

Figure 3 is a diagram illustrating the problems involved in correcting the system for variations in the angle of the aircraft.

Figure 4 is a schematic diagram of the circuit for correcting for variations in the angle of the aircraft.

Figure 5 is a schematic diagram, with the printers shown in perspective, of a modified form of the invention.

Figure 6 is a schematic diagram of the radius computer of Figure 2.

Figure 9 is a block diagram of another form of my invention involving color printing.

Figure 2:
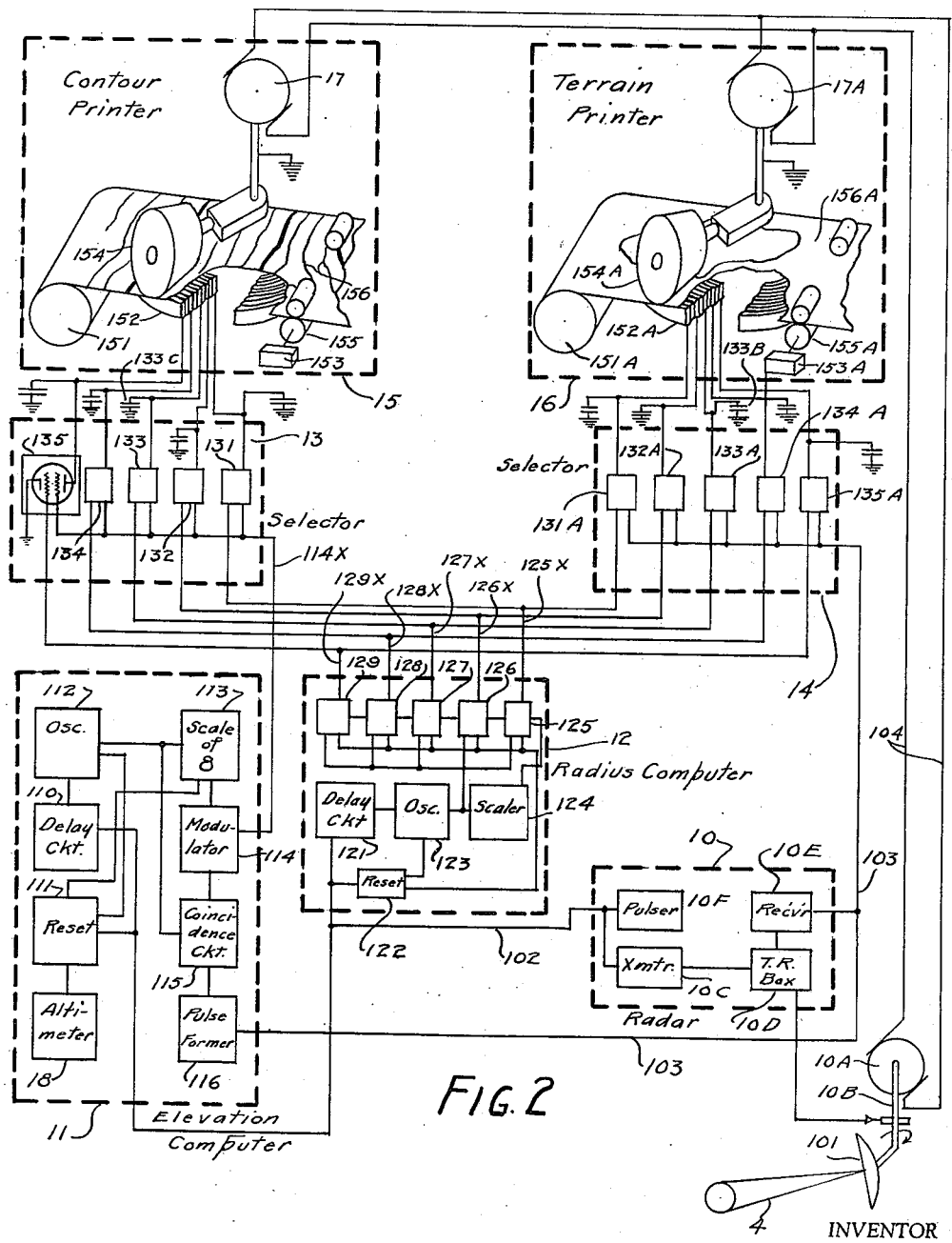
Figure 2 is a schematic block diagram of one form of the invention, the printers being shown in perspective.

Figure 10 is a schematic diagram of sweep generator 222 of Figures 4 and 9. Sweep generator 208 is of similar construction.

Although the possession of accurate contour or relief maps of a terrain region is of great importance in such operations as military campaigns, air navigation, highway planning, agriculture, and many other activities, there are at present large areas of the earth which have not been mapped in a way which provides knowledge of the elevations of the terrain at various points, because of the enormous labor involved in making the necessarily large number of individual terrain observations and computing and plotting the necessary maps. The system to be described below is a complete unit for the taking and recording of several thousand terrain observations each second and the plotting of these observations in the form of a contour map which is familiar to persons skilled in mapping and in the use of maps. The device also provides for a recording of the radar reflectance of the various terrain elements which come under its observation so that the contour map may be keyed in with water courses, cities, bridges, and other prominent radar reflectors to couple it with existing maps and with other maps made by this same process.

The terrain observation is performed from an aircraft by means of a radar system which periodically sends out short pulses of high frequency radio waves to travel to the terrain and back along the direction of a fairly well defined beam of radiation. The system of computation of the contour map elements from the radar information can best be understood by an examination of Figure 1. This figure shows the radar bearing aircraft in flight along line $I$ at altitude $h$ over base plane 3. The radar beam radiated from the aircraft at angle $\theta$ below the horizontal is represented by zone 4. The radar pulses sent out along beam 4 intersect terrain profile 5 in a small segment 6 and a portion of the radio frequency energy is re-radiated or reflected from terrain element 6 to the radar set in the aircraft. Measurement of the time interval at the aircraft between the radiation of a pulse and the receipt of its echo may be used to determine distance R, as the radio waves propagate through air at the well known velocity of 186,000 miles per second. At the same time, knowledge of altitude $h$ through the operation of a sensitive barometric altimeter and knowledge of angle $\theta$ permit the calculation of distance $R_0$, which is the distance the waves would have travelled before reflection to reach base level 3. Rotation of the radar antenna about vertical axis 2 allows the determination of R for terrain elements lying on a rough circle about the point of intersection of line 2 with the terrain. As the aircraft progresses along line 1, the mapper sweeps out a zone whose width is approximately $2r$. For each observation, the radar set in the aircraft determines $R$, $\theta$, and $\phi$, where $\phi$ is the angle of rotation of the radar antenna about axis 2 with respect to the central axis of the aircraft, or with respect to magnetic North, depending on the coordinates which are chosen.

The computations which are of interest in reducing the above data to map form involve the determination of $r$ and the determination of $A$ for a given set of values of $\phi$, $\theta$, and $R$ and a measured value of $h$. These calculations are formed in the following way:

$$r = R \cos \theta \qquad 1$$
$$A = (R_0 - R) \sin \theta \qquad 2$$
$$R_0 = h/\sin \theta \qquad 3$$

Combining Equations 2 and 3 we have $$A = h - R \sin \theta \qquad 4$$

The map printer to be hereinafter described forms signals dependent on the computed value of $A$ and prints them on paper at scale distances $r$ and angles $\phi$ from the scale positions of the aircraft. Since the scanning motion of the radar antenna may cause information to be drawn from contiguous or overlapping terrain elements, the elevation symbols on the map may be the familiar contour lines which may be generated in a continuous manner as the aircraft flies over a predetermined area.

The operation of the computing and recording system is better understood through reference to the block diagram of Figure 2; where radar set 10, which is of conventional design, comprises a pulsed type of high frequency transmitter 10C, a transmit receive switch 10D, antenna array 101 capable of projecting energy into narrow beam 4, and a receiver 10E sensitive to the weak echo signals returned from terrain element 6, as received through antenna 101. Pulser 10F supplies very short trigger pulses to the radar transmitter 10C and to cable 102 as is well known.

Cable 102 from radar set 10 carries the trigger pulses which are respectively timed to coincide with the transmitted pulses of radio frequency energy from radar set 10. Each trigger pulse is carried to radius computer 12 and to elevation computer 11 where it serves to start the cycle of computation of the correct radius of terrain element 6 and the elevation of terrain element 6 above the previously chosen base level.

Cable 103 carries the returned echo signal from terrain element 6 to elevation computer 11 and to selector 14. The time elapsed between the trigger pulse on cable 102 and the returned terrain signal on cable 103 is used in computers 11 and 12 for the computation of the correct printing radius and the correct elevation signal.

The operation of elevation computer 11 is controlled and corrected by altimeter 18 for changes in the altitude of flight of the aircraft, but in the first form of the system herein illustrated other fluctuations in the aircraft flight path are uncorrected and may introduce distortions in the map. A second form to be described later has provision for certain corrections to eliminate the effect of aircraft fluctuations.

Printer 15 produces a contour map, on which marks are made in the form of contour lines to indicate the elevations of terrain points from which information is received. Printer 16 produces a map which is geometrically to the same scale as that of printer 15, but in which a signal is printed continuously which is dependent on the amplitude of the returned echo signal. The printers contemplated here are of the facsimile type, in which an electrical impulse passes through a paper which is sensitized by chemical means and causes a change in the color or light reflecting power of the paper. It would also be feasible to use other recording means, and in printer 15 it would be possible to print a density corresponding to the elevation of the terrain elements instead of printing ordinary contour lines.

The synchronous motors 17, 17A and 10A which respectively drive the roller 154, roller 154A, and shaft 10B, operate at the same speed and are energized by the same alternating current power leads 104.

Printers 15 and 16 are similar in mechanical form and differ only in excitation. Printer 15 is shown in Figure 2, and its operation will be understood to be the same as that of printer 16 except for the nature of the electrical signals which are passed to it for printing. Printing paper is drawn from supply roll 151 by drive unit 153 which actuates rollers 155 to pull the paper from roll 151 through the printing assembly at a speed proportional to the ground speed of the aircraft. The printing is done between cone 154 and plate 152. Cone 154 is driven by motor 17 in a circular path over plate 152, and the printing is accomplished by the passage of electrical current between cone 154 and one of the conducting rings which make up plate 152. The projection of the vertical shaft of unit 17 onto the paper is the scale ground position of the aircraft, and the angle of cone 154 about this shaft is maintained synchronously with the angle of the radar antenna about its vertical axis by drive unit 10A. Selector 13, operating in response to range computer 12 picks the ring of plate 152 which represents the scale radius of the terrain element being printed, and the signal representative of altitude as determined by computer 11 is applied to the selected ring. In this way, every time the radar beam passes the position of a contour line on the terrain, a mark corresponding to the contour line is drawn in scale position on the map by printer 15. The result, after a period of flight is a contour map with lines 156 indicating the elevations of the terrain elements which come under the observation of the radar set. The way in which these signals are derived will now be explained.

Radius computer 12 is illustrated in detail in Figure 6. It receives the trigger pulse from radar set 10 and supplies signals to selectors 14 and 13 dependent on the printing radius. The printing radius is broken up into discrete incremental elements as shown in Figure 2 by the use of discrete range rings in plate 152. Computer 12 divides the time after transmission of the radar pulse into a number of discrete intervals corresponding with the rings in plate 152 and passes information on this selection to selectors 13 and 14. Referring to Figure 2, the trigger pulse from radar set 10 operates through reset element 122 to stop the action of oscillator 123, clear scaling circuit 124, and stop the action of counting elements 125 through 129. A short time later the same trigger pulse passes through delay circuit 121 and serves to start the operation of the computer for the new radar pulse. Oscillator 123 is started by the pulse. It sends periodic impulses to scaling circuit 124 and to counting elements 125 through 129. Scaling circuit 124 receives the pulses until it has counted a number corresponding to the radius of the innermost printing ring of plate 152 (hereinafter called the "IR number") and then passes a pulse to counting element 125. Element 125 cannot respond to pulses from oscillator 123 until it receives a pulse from scaling circuit 124, but after receipt of both pulses it passes a signal to element 126, which on receipt of the next impulse from oscillator 123 passes a signal to element 127. Elements 125 through 129 are thus energized in successive order, returning to their quiescent states after passing signals to the succeeding elements. Although only five elements are shown here for purposes of illustration I actually employ a large number of such elements one for each of the large number of rings in plate 152.

The frequency of oscillator 123 is determined by the range interval between rings on plate 152 and by the angle θ by which the radar beam is depressed below the horizontal. Specifically the frequency of oscillator 123 is given by $$f = c \cos \theta / 2 dr \qquad 5$$

where $f$ is the oscillator frequency, $c$ is the velocity of radio waves, and $dr$ is the difference in radius along the ground presented by the spacing between adjacent rings of printing plate 152. Scaling circuit 124 counts a number of pulses called the "IR number":

$$n = r_0 / dr \qquad 6$$

where $n$ is the "IR number" of pulses and $r_0$ is the radius of the innermost ring of plate 152. Each of elements 125 through 129 corresponds to an individual ring in plate 152. The signals passed from computer 12 to selectors 13 and 14 thus enable printing with successive rings of plate 152 as determined by the time after transmission of the radar pulse, the values of $\cos \theta$ and $dr$, and the radius of the innermost printer ring, $r_0$.

In Figure 6, which shows the radius computer 12 in greater detail, the radar trigger pulse is received over wire 102 and any direct current components are blocked by condenser 1A1, and this condenser in combination with resistor 1A2 serves as a differentiating device to produce a steep positive voltage spike at the beginning of the radar trigger pulse and a steep negative voltage spike at the end of the radar trigger pulse. Diode vacuum tube 1A4 does not draw current on the positive spike, but does draw current on the negative spike and serves in conjunction with resistor 1A3 to prevent the large negative spike from reaching the grid of tube 1A5. Resistor 1A6 and condenser 1A7 serve to bias tube 1A5 in the conventional way, and the sharp positive voltage spike causes increased electron current in tube 1A5, which increased current flowing through resistor 1A9 and inductor 1A8 causes a sharp negative output voltage pulse which is passed out through condenser 1A10 to actuate the oscillator 123, and counting circuits 125 to 129, etc., through tube 1A12. Tube 1A12 is used as a phase inverter to supply positive reset pulses to those circuits requiring a positive reset pulse.

Oscillator 123 which is diagrammed in Figure 6 is a common type of radio oscillator with an output stage designed to produce a series of evenly spaced negative pulses. It is turned off by negative reset pulses (which block the grid of 2A5) and started again by the positive radar trigger pulse passed through delay circuit 121 through the action of tubes 2A5 and 2A13. These tubes 2A5 and 2A13 serve to place a negative grid bias on oscillator tube 2A17 during the period of quiescense. Tubes 2A5 and 2A13 form a more or less conventional flip-flop circuit of the multivibrator type. Tube 2A5 is normally conducting and tube 2A13 is normally biased beyond cutoff by current flowing through resistors 2A12 and 2A9. When the negative reset pulse is applied to the grid of tube 2A5, the multivibrator action reduces the current in tube 2A5 to zero and causes current to flow in tube 2A13. This results in a decrease in the plate voltage of tube 2A13 which is communicated through condenser 2A14 to the grid of tube 2A17, causing the grid to be biased far beyond cutoff and causing oscillations to cease. Delay circuit 121 is comprised of a number of series inductive elements and parallel capacitors which represent a long section of electrical transmission line and thus delay the trigger pulse by an amount of time sufficient to permit resetting of the remaining circuit for a new computation. When the radar trigger pulse arrives through delay circuit 121, it reverses the phase of operation of the multivibrator, causing the plate voltage of tube 2A13 to rise sharply and bringing the grid of oscillator 2A17 back into the operating region. The frequency of oscillator 2A17 is controlled by tuned circuit 2A20 and by the action of reactance tube 2A25. Tube 2A25 is excited from the oscillations in tuned circuit 2A20. Condenser 2A26 and resistor 2A27 shift the phase of grid excitation so that the alternating component of plate current flowing in tube 2A25 is in a reactive phase relationship with the plate voltage. The amount of reactance can thus be controlled by the grid bias of the tube. This grid bias is derived from the correction circuit of Figure 4, and as hereinafter explained serves to change the frequency of oscillator 123 in accordance with angular displacements of the aircraft. In the simple system, uncorrected for aircraft motion, tube 2A25 is omitted. Tube 2A23 is biased to cutoff. An exciting coil in its grid circuit is coupled to tuned circuit 2A20. The tube output thus consists of a series of negative voltage pulses which are spaced evenly at the frequency of oscillation of the circuit of tube 2A17. These pulses are passed on to operate the remaining units.

As will be apparent, scaler 124 is essentially a counting circuit which counts a number of output oscillator pulses dependent on the scale diameter of the innermost concentric ring of printers 15 and 16. Since the oscillator starts to operate shortly after the emission of each radar pulse and the innermost printer ring is not at zero radius, it is necessary to count a number of oscillator pulses before starting the operation of stepping circuits 125 through 129. This might alternately be done by increasing the delay of circuit 121 and omitting scaler 124, but the scaler is preferred for reasons of flexibility and reliability. Scaler 124 includes a number of similar units the first unit of which is shown in detail in Figure 6. The first of such units consists of parts 3A1 to and inclusive of 3A18. Two other such units are shown in block form and bear reference numbers 124B and 124C. It is of course understood that while I have shown only three units, I contemplate a larger number of such units as making up scaler 124, all of which will hereinafter appear and become obvious. Each unit serves to divide the number of input pulses by two so that the use of a number of such units in series will count readily numbers of pulses which are simple powers of 2, such as, 2, 4, 8, 16, 32, 64, etc. The counting of 4096 pulses, for instance would require a cascade of 12 units. If intermediate numbers of pulses are required they can be obtained by the use of interpolation circuits based on the currents flowing in the various units of the scaling circuit or by the use of subsidiary scalers actuated at the completion of a predetermined count by this circuit. The circuit of scaler 124 is merely one type of scaler which could be used, and many similar ones are known in the art (see for example Cork, Radioactivity and Nuclear Physics, D. Van Nostrand (New York) 1947, p. 45).

The scaler 124 of Figure 6 receives the train of negative pulses emitted by the oscillator or a divided train of negative pulses emitted by a previous similar unit, according to its place in the scaling chain. The negative pulses are passed by diode tube 3A1 to the first grids of both tubes 3A2 and 3A3. The circuit formed by tubes 3A2 and 3A3 is a feedback amplifier type of circuit so arranged that it has two stable conditions and so that successive pulses received on the first grids of the tubes will flip it alternately from one stable position to the other. In the condition obtaining after operation of the reset circuit, tube 3A2 is conducting a large electron current, causing its plate voltage to be relatively low. This low voltage is communicated through resistor 3A8 to the second grid of tube 3A3, where in combination with a negative voltage applied through resistor 3A11, the operation of the second grid of tube 3A3 is to cut off plate current in that tube and permit the plate to assume a relatively high voltage. This high voltage is communicated in turn through resistor 3A9 to the second grid of tube 3A2, where it prevents the negative voltage applied through resistor 3A10 from cutting off the grid and thus maintains the flow of current in the tube. When a negative pulse is applied to both grids it can have no effect on tube 3A3 since plate current is already cut off, but it diminishes the current through tube 3A2, causing the potential of the plate to rise and causing a sharp rise in potential of the second grid of tube 3A3. Plate current in tube 3A3 is started by the rise in grid voltage. This serves to diminish the voltage of the plate of tube 3A3 and in turn to diminish the voltage of the second grid of tube 3A2 to the point where plate current is cut off in tube 3A2 and the circuit has been transferred to its alternative stable position. A second negative pulse applied to both grids through diode 3A1 fails to affect tube 3A2 but reduces the current in tube 3A3 and so shifts the circuit to its original condition.

Output from the circuit is obtained through condenser 3A16 which feeds resistor 3A17 and diode 3A4. During the first change of phase of the circuit, the pulse reaching diode 3A4 is positive, caused by a cutoff of plate current of tube 3A2, and is therefore not transmitted to the next circuit. During the return to original condition, caused by the second pulse, diode 3A4 passes the resulting negative pulse to the next circuit. Diodes 3A1 and 3A4 are similar in function, and only one of them is needed between circuits. The circuits 124B, 124C, etc. may omit tube 3A1 and may be therefore composed of only three of the four tubes shown.

Resetting of the circuit is accomplished at the completion of a pulse interval by a positive pulse applied through condenser 3A18 to the second grid of tube 3A2. This reset pulse does not affect the circuit if tube 3A2 is conducting but renders tube 3A2 conducting and tube 3A3 nonconducting if the circuit is not already in that condition.

Stepping circuits 125 through 129 are similar in design and in purpose. It is the intent of the stepping chain to take an output pulse at the conclusion of operation of scaler 124 and pass an active pulse along the line, moving the active stage one step for each negative output pulse from oscillator 123. The several steppers 125 to 129 inclusive are all of similar construction and therefore Figure 6 illustrates only the first of them in detail. Their output leads 125X to 129X respectively pass to the selectors 13 and 14 as shown in Figure 2. Tubes 4A1 and 4A2 are connected in a "one shot multivibrator" type of circuit, involving regenerative feedback. Tube 4A1 is normally maintained at a grid voltage beyond cutoff by current flowing through resistors 4A14 and 4A12. It is thus normally insensitive to the oscillator pulses applied through condenser 4A7. At the conclusion of scaler activity, or at the termination of the open time of the previous stepper circuit, if this is not the first one in the chain, a positive pulse is applied through condenser 4A3 to the grid of tube 4A2. The pulse is of sufficient amplitude to start the flow of plate current in tube 4A2 and through the regenerative feedback action of the circuit, tube 4A2 is soon fully conducting, and tube 4A1 is nearly cut off. The start of plate current in tube 4A2 passes a negative pulse from its plate to the next stage through the output lead, but since the tube to which it goes is biased beyond cutoff, no passing of the pulse results. When the next negative oscillator pulse reaches the grid of tube 4A2, the multivibrator action is reversed, and tube 4A2 is once more cut off and 4A1 rendered conducting. The positive pulse generated at the plate of tube 4A2 by the reversal of the multivibrator starts the action of the next stepping circuit. In the quiescent state of the circuit, the voltage of the plate of tube 4A1 is relatively low, because of current conducted through resistor 4A8. During the time of operation of this stepper, the current of tube 4A1 is reduced and the plate voltage thus rises. Condenser 4A9 is used to communicate this rise in voltage to selector circuits as shown in Figure 2.

The reset function to make the stepping chain ready for the next pulse is carried out by a positive pulse applied to the grid of tube 4A1. If the circuit is already in its quiescent state, no further action occurs, but if it is in the active state it is returned to the quiescent state by the action of the reset pulse.

Figure 7:
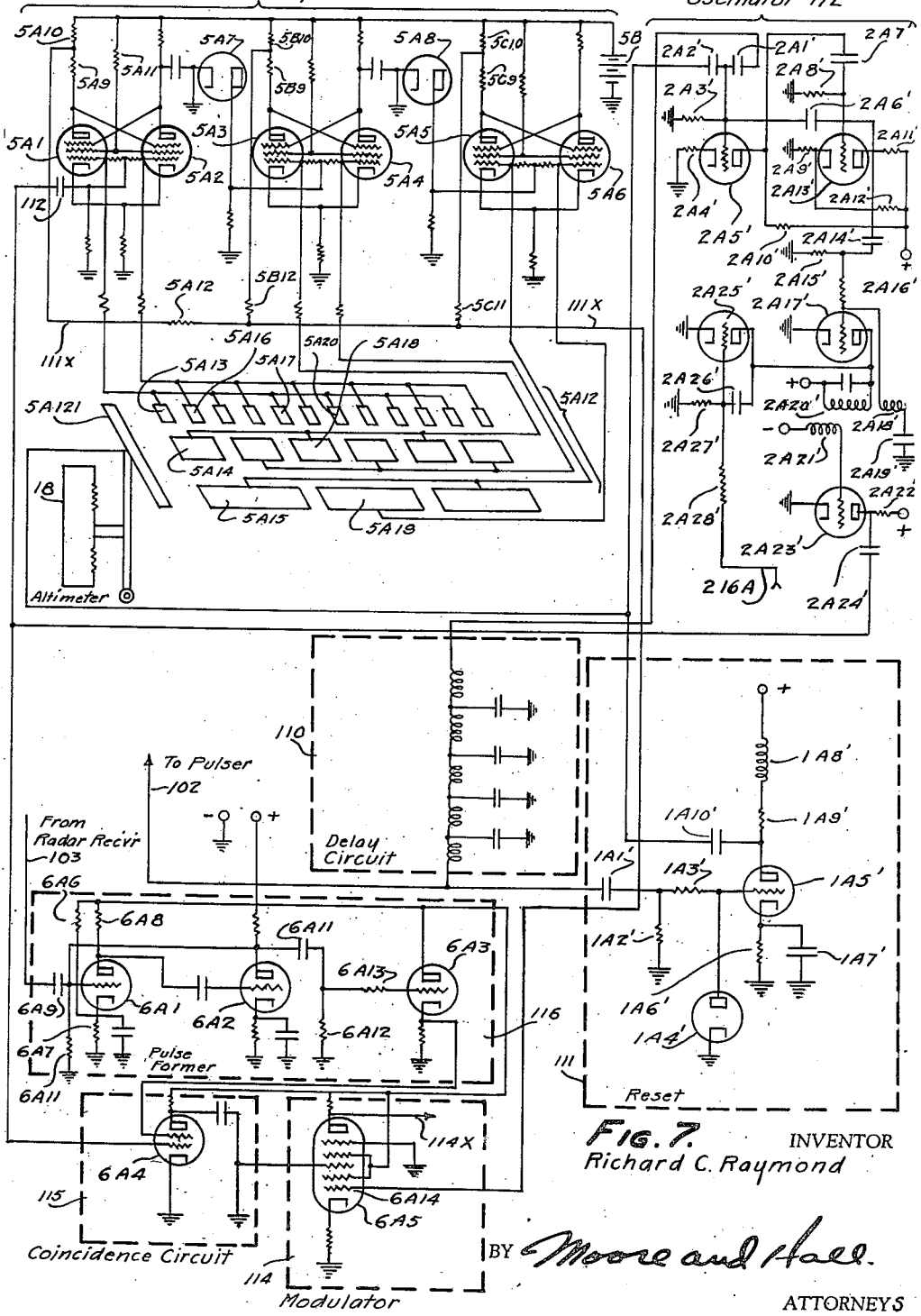
Figure 7 is a schematic diagram of the elevation computer of Figure 2.

Figures 2 and 7 illustrate the action of elevation computer 11. It is designed to start a cycle of operation on receipt of the trigger pulse and to deliver the selector 13 a signal whose intensity or other characteristic may be dependent on the elevation of the terrain element above the base level. In the form of instrument described here, the printing of contour lines is contemplated, and the signal passed to the printer is modified by computer 11 so that a number of separate intensity levels dependent on the elevation are repeated in succession in the same way that the weight of contour lines on an ordinary map is varied in cyclic fashion.

The trigger pulse received over cable 102 from radar set 10 is passed into delay circuit 110 and to reset circuit 111. The latter stops the action of oscillator 112 and resets scaling circuit 113 to a position determined by the reading of altimeter 18. The trigger pulse arriving through delay circuit 110 starts oscillator 112. Oscillator 112 passes successive electrical impulses to scaling circuit 113, which alters its condition in cyclic fashion, starting with the condition determined by altimeter 18 and passing through 8 successive conditions before repeating.

The video signal return from radar set 10 passes along wire 103 and is applied as it is received to pulse former 116. This circuit determines the center of the rising edge of the return pulse and forms a pulse at the instant and independent of the amplitude of the radar return pulse. The pulse formed from the radar return is passed through circuit 115 where it is examined for coincidence in time with a portion of the output impulse of oscillator 112. Pulses from forming circuit 116 which are coincident with those from oscillator 112 are then passed to modulator 114. Those which are not coincident within certain limits are rejected by coincidence circuit 115. In modulator 114, the pulses passed by coincidence circuit 115 are modulated in amplitude according to the condition of scaling circuit 113 and passed to the selector stages for printing. The output to the selector stage thus occurs when the radar return pulse is essentially coincident with a cycle of oscillator 112, or coincident in elevation with one of the established contour intervals. This output is modified by modulator 114 to show which contour line is involved, as determined by scaling circuit 113.

Referring to Figure 7, which shows the elevation computer 11 in detail, it is noted that reset circuit 111 is generally similar to reset 122 of Figure 6, and like parts bear like reference characters except that those of Figure 7 are primed. Likewise, oscillator 112 of Figure 7 is similar to oscillator 123 of Figure 6 and like parts bear like reference characters except that those of Figure 7 are primed. Pulse forming circuit 116 is for the purpose of preparing the radar ground return pulse for use in coincidence circuit 115. Coincidence circuit 115 determines whether the radar return pulse coincidences in time with one of the negative pulses from oscillator 112 in order to determine whether a contour line should be printed for that particular return. Scale of 8, 113, and modulator 114 determine the density of the contour line which is printed in response to the signal passed by coincidence circuit 115.

Figure 8:
Figure 8 shows the voltage output of the "scale of 8" circuit of Figure 7.

Figure 7 also illustrates the cooperation of altimeter 18 with reset 111. Tubes 5A1 through 5A8 comprise the scaling circuit. This circuit is similar in function to the circuit of scaler 124 of Figure 6 but differs in a number of details. Tubes 5A1 and 5A2 constitute one element of the circuit, and their operations are essentially duplicated by those of the remaining two pairs of tubes. Tubes 5A7 and 5A8 are diodes which serve to couple the circuits in such a way that only negative pulses may be passed from circuit to circuit. As will be seen in the figure, the feedback connection in each scaling pair is made by connecting the suppressor grid of each pentode to the plate of the opposite tube. The cathodes of the two tubes are also connected in parallel across the same cathode resistor so that if one of the tubes is conducting and the other one is non-conducting the condition will remain that way by virtue of the cathode bias connected from the conducting tube to the nonconducting one and the fact that the suppressor grid of the conducting tube is maintained at a relatively high voltage by the lack of plate current in the nonconducting tube and the suppressor grid of the nonconducting tube is maintained at a relatively low voltage because of the voltage drop in the plate resistor of the conducting tube. Under these conditions, a negative pulse applied to both grids in parallel will serve to reverse the condition of the scaling circuit in much the same way described in the case of scaling circuit 124, and as scaling circuit 113 is connected, every second pulse will be transmitted to the second pair of tubes, every fourth to the last pair, and every eighth will return the entire circuit to its original conditions. If we connect resistors such as 5A9 and 5A10 into one plate lead of every pair and proportion their resistance values so that the contribution from the second pair is about twice and that of the third pair about four times the contribution of the first pair to the output circuit, the lead 111X to modulator 114 will carry a positive voltage which decreases by regular steps for each oscillator pulse until it has gone down seven steps and then returns to its original value at the eighth pulse, as shown in the graph of voltage as a function of time in Figure 8. This regularly changing voltage is used in modulator 114 to determine the density of contour lines to be printed according to the terrain elevation from which the echoes are received.

It is obvious from the foregoing that tube 5A5 and the resistors in series with it are designed to carry a heavy current. The resistors 5C9, 5C10 and 5C11 are selected of such value as compared to the others in the "scale of 8" circuit that when tube 5A5 is conducting and 5A1 and 5A3 are not conducting that the potential on wire 111X will drop to half of the potential it would attain if none of tubes 5A1, 5A3 and 5A5 were energized. It is noted in this connection that there are two current paths from battery 5B to the anode of tube 5A5. One of the paths is through resistors 5C10 and 5C9. The other is through resistors 5A10, 5A12, 5C11, and 5C9. The current in the anode of tube 5A3 is less than that for tube 5A5, and resistors 5B9, 5B10 and 5B12 have such resistance values in relation to the others in the circuit that tube 5A3 when energized will cause the potential on wire 111X to drop about one half as much as tube 5A5 causes it to drop. Similarly resistors 5A9, 5A10, and 5A12 are of such values that when tube 5A1 is energized that it will cause the potential on wire 111X to drop about half as much as when tube 5A3 is energized. The relationships of the values of all of the resistors referred to in this paragraph are such that if none of tubes 5A1, 5A3 and 5A5 are energized the potential on line 111X will rise to a given value which I will call 8 units of potential. When tube 5A1 is energized (5A3 and 5A5, not being energized) the potential on 111X is seven units. If 5A3 is energized (5A1 and 5A5 not being energized) the potential at 111X is six units. When 5A1 and 5A3 are energized (5A5 not being energized) the potential at 111X is 5 units. If 5A5 is energized (5A1 and 5A3 not being energized) the potential at 111X is four units. When 5A1 and 5A5 are energized, and 5A3 not energized, the potential at 111X is three units. If 5A5 and 5A3 are energized, with 5A1 not energized, the potential at 111X is two units. With all three of 5A1, 5A3 and 5A5 energized the potential at 111X is only one unit.

Resetting of the scaling circuit is carried out with reference to the pressure altitude of the aircraft so that variations in the aircraft altitude during a mapping flight may be corrected for automatically in the final printing. Negative pulses from reset 111 are passed through commutator 5A12 to the reset leads from scaling circuit 113. Barometric altimeter 18 which is shown schematically moves the commutator bar 5A121 so that it engages segments appropriate to the aircraft altitude above the datum level. The top row of segments (which includes segment 5A13) is connected to the first scaling pair of tubes 5A1 and 5A2 and is composed of relatively short segments. The first scaling pair is therefore reset to a condition dependent on small changes in altitude. Each segment of the second row of segments (the row including segment 5A14) corresponds to twice the change in altitude of the first pair, and each segment of the third row of segments (the row including segment 5A15) corresponds to four times the change in altitude of the first pair. In each row alternate segments are connected through appropriate resistive networks to alternate grids so that the negative reset pulse is passed to one grid or the other, depending on the condition to which it is desired to reset the scaling pair. The segments in the first row correspond in altitude to the difference in altitude between adjacent contour lines so that proper modulating voltages are supplied to the map printer, independent of the aircraft altitude. It is of course understood that addition of more tubes and more commutator contacts would make it possible to use more than 8 different levels of voltage, or conversely that some of these levels may be omitted by proper redesign of the equipment. The number 8 is chosen as representative of a desirable number in practice.

Figure 7 also illustrates pulse former 116, coincidence circuit 115, and modulator 114. Tubes 6A1 and 6A2 are coupled in a "one shot multivibrator" circuit designed to receive the radar ground return signal and produce from it a wave of essentially rectangular form whose amplitude and duration are independent of the form of the return signal. In operation tube 6A1 is normally biased to cutoff through the action of resistors 6A6 and 6A7. The positive pulse received from the radar receiver is differentiated somewhat by condenser 6A9 and resistor 6A10 and the leading edge of the pulse is applied to the grid of 6A1. The multivibrator action causes tube 6A1 to conduct and cuts off tube 6A2 for a period determined by the constants of the multivibrator circuit, producing a rectangular wave of voltage of positive sign at the plate of tube 6A2. The rectangular wave is differentiated strongly by condenser 6A11 and resistor 6A12 and applied to the grid of tube 6A3, which operates as a cathode follower with a plate current approaching a saturation value. The positive voltage spike resulting from the differentiation of the rectangular wave has little effect on the plate current of tube 6A3, but the negative spike is passed due to the non-linear operation of the tube. Tube 6A4 operates as a coincidence amplifier. It is adjusted to give little output when either of its grids is excited separately but to give a full positive pulse output when both grids are pulsed negatively at the same instant. One grid is driven by the wave described above, developed from the radar terrain return, and the other grid is driven by the regular pulses of oscillator 112. When the radar return pulse is essentially coincident with a pulse of oscillator 112, it means that the terrain echo comes from a point which is at or near the elevation of one of the selected contour intervals, and a pulse is passed to the injection grid of tube 6A5. In tube 6A5, the pulse passed by tube 6A4 is modulated by the signal from scaler 113 to indicate which of several contour intervals is involved, and the output signal of tube 6A5 is passed over wire 114X (see Figures 2 and 7) to the selector circuit 13.

The operation of Figure 7 can be illustrated by studying a specific example of operation as follows: Assume that when the aircraft flies at 7000 feet above base level 3 (of Figure 1) that the contactor 5A121 engages contact strips 5A13, 5A14 and 5A15. Assume further that for each 1000 feet that the aircraft descends that contactor 5A121 moves to the right by one contact element, hence when the aircraft is at 6000 feet the contactor 5A121 will engage contact elements 5A16, 5A14, and 5A15. When the aircraft descends to 3000 feet, for example, the contactor 5A121 will engage contact elements 5A17, 5A18 and 5A19.

Reverting back to the assumptions applying to 7000 feet it is noted that when a pulse is received from the radar pulser over wire line 102 the pulse will pass through reset 111 to the contactor 5A121, and therefrom to contact elements 5A13, 5A14, and 5A15. These contact elements are respectively connected to the grids of tubes 5A1, 5A3 and 5A5. Since the pulse applied to contactor 5A121 is negative these three tubes are all biased to cut-off. Under these circumstances no current flows in any of resistors 5A10, 5B10 or 5C10, and therefore substantially the full potential of battery 5B is impressed on wire 111X, however there is some resistance in the circuit and therefore I will assume that this condition of the apparatus represents 8 units of potential applied to the grid 6A14. To illustrate further the following table shows whether the several tubes are conducting (represented by "C") or non-conducting (represented by "N"), for the eight different conditions prevailing in response to the receipt of seven pulses:

| Number of pulses from oscillator 112 | 5A1 | 5A2 | 5A3 | 5A4 | 5A5 | 5A6 | Units of Potential |
|---|---|---|---|---|---|---|---|
| 0 | N | C | N | C | N | C | 8 |
| 1 | C | N | N | C | N | C | 7 |
| 2 | N | C | C | N | N | C | 6 |
| 3 | C | N | C | N | N | C | 5 |
| 4 | N | C | N | C | C | N | 4 |
| 5 | C | N | N | C | C | N | 3 |
| 6 | N | C | C | N | C | N | 2 |
| 7 | C | N | C | N | C | N | 1 |
| 8 | N | C | N | C | N | C | 8 |

In studying the foregoing table it is noted that when tube 5A5 is conducting it reduces the potential by four units, when 5A3 is conducting it reduces the potential by two units, and when 5A1 is conducting it reduces the potential by one unit.

Let us now assume that the aircraft descends to 6000 feet and contactor 5A121 moves to contact element 5A16. The table for this condition is as follows:

| Number of pulses from oscillator 112 | 5A1 | 5A2 | 5A3 | 5A4 | 5A5 | 5A6 | Units of Potential |
|---|---|---|---|---|---|---|---|
| 0 | C | N | N | C | N | C | 7 |
| 1 | N | C | C | N | N | C | 6 |
| 2 | C | N | C | N | N | C | 5 |
| 3 | N | C | N | C | N | C | 4 |
| 4 | C | N | N | C | C | N | 3 |
| 5 | N | C | C | N | C | N | 2 |
| 6 | C | N | C | C | N | N | 1 |
| 7 | N | C | N | N | C | C | 8 |
| 8 | C | N | N | N | C | C | 7 |

Assume that the aircraft descends to 3000 feet, the contactor 5A121 would move to contact elements 5A17, 5A18, and 5A19, and the table would appear as follows:

| Number of pulses from oscillator 112 | 5A1 | 5A2 | 5A3 | 5A4 | 5A5 | 5A6 | Units of Potential |
|---|---|---|---|---|---|---|---|
| 0 | N | C | C | N | C | N | 2 |
| 1 | C | N | C | N | C | N | 1 |
| 2 | N | C | N | C | N | C | 8 |
| 3 | C | N | C | N | N | C | 7 |
| 4 | N | C | N | C | N | C | 6 |
| 5 | C | N | C | N | N | C | 5 |
| 6 | N | C | N | C | C | N | 4 |
| 7 | C | N | N | C | C | N | 3 |
| 8 | N | C | C | N | C | N | 2 |

It is further noted that the first row of contact elements (the row including 5A13 and 5A17) may include more than seven elements, even though there are only eight different units of potential available. In event the contactor 5A121 advances past the seventh contact element 5A20, the value of potential representing that altitude will be the same as the value that represents an altitude eight contact elements higher.

The selector 14 has amplifiers 131A to 135A which are identical to amplifiers 131 to 135 respectively, and the parts of terrain printer corresponds to parts of the contour printer bearing similar reference numbers, however parts of the terrain printer include "A" on the end of their reference characters.

To further illustrate the operation of the system, assume that the aircraft is flying at 6000 feet and that the radar beam 4 intercepts an element 6 (see Figure 1) which is at 5000 feet. The pulser 10F transmits the outgoing pulse to the transmitter 10C, reset 122, delay circuit 121, reset 111, and delay circuit 110. The altimeter 18 has moved the contactor 5A121 to engage contact elements 5A16, 5A14 and 5A15. Then the pulse over line 102 biases tubes 5A2, 5A3 and 5A5 to cut-off. The two delay circuits delay the pulse for a short period. At the termination of that period, oscillators 112 and 123 begin to generate pulses. Since the elevation of the craft above ground element 6 is not great, only a few pulses will be generated by oscillator 123 before there is a return pulse detected by receiver 10E and passed along to wire 103. Assume that the return pulse corresponds to the third pulse from oscillator 123, then pulser element 127 and amplifiers 133 and 133A will be energized concurrently with the return pulse on line 103. These amplifiers will not, however, energize their complementary rings of the printers unless their second grids are energized. The return pulse on line 103 energizes the second grid of amplifier 133A concurrently with the energization of amplifier 133A by element 127, and therefore a pulse passes to the third ring of printer 16.

Since the angular position of roller 154A corresponds to that of antenna 101, the terrain printer will print a spot at a position corresponding to that of the element of terrain detected. The condenser 133B will widen the pulse somewhat. The intensity of the printed spot will depend on the ability of element 6 to reflect, and also to some extent on the altitude of element 6. However in the determination of the altitude of part 6, the contour map which has only contour lines, is laid on top of the terrain map. When said return pulse passed over line 103 it energized pulse former 116, and coincidence circuit 115. The output of the coincidence circuit energizes modulator 114. Concurrently the oscillator 123 would generate its first pulse and thus trigger "scale of 8" to reduce its output potential by one unit from its 8 unit of potential condition. Therefore, the amplitude of modulation impressed on wire 114X will be 7/8 of maximum. This output will be concurrent with the energization of the first grid of amplifier 133 by element 127. The output of amplifier 133 is stored to some degree in condenser 133C to broaden the pulse, and is then applied to the third ring of contour printer 15. The roller 154 prints the pulse at an angular position corresponding to the angular position of antenna 101. It is noted that only elements of terrain falling within a specified tolerance near contour lines will be printed. This results from the fact that coincidence circuit 115 only passes pulses when they are nearly concurrent with one of the pulses from oscillator 112. This oscillator generates pulses corresponding to the levels of the several contour lines.

Certain of the features of the two printers 15 and 16 herein shown, and their relation to other parts of the circuit are described in my prior copending application Serial No. 92,616, filed May 11, 1949, entitled Method of and Apparatus for Indicating and/or Recording Data, now abandoned.

Selectors 13 and 14 are identical in construction and similar in function. Each one consists of a number of amplifier stages which are controlled by the output of radius computer 12 so that only one amplifier is energized at any instant during the printing cycle. These amplifiers serve to select the printing rings in the base plates of printers 15 and 16 corresponding to the proper scale radius and to pass the printing signals derived from elevation computer 11 to printer 15 and from the radar video return to printer 16. They also serve to lengthen the time interval occupied by the signals under discussion so that more time may be taken to print the signals properly on the facsimile paper. Since the two selectors are identical, only selector 13 will be described in detail.

Radius computer 12 produces a signal on one of the amplifiers of selector 13 at a particular time after the transmitted pulse, corresponding to a particular scale radius on the printed map from the vertically projected position of the aircraft. Amplifier stages 131 through 135 are all similar, and amplifier 135 is shown in detail as a conventional amplifier. The output of elevation computer 11 is applied to all the stages in parallel, but unless the output of radius computer 12 is applied simultaneously, no voltages are delivered to printer 15. When the output of computer 11 coincides with the output of computer 12 in a particular amplifier stage, that stage produces an output which is printed by the appropriate ring of printer 15. In operation, a finite time interval occurs between the transmitted radar pulse and the excitation of amplifier 131. After a time corresponding to the radius of the innermost printing ring in printer 15, amplifier 131 is enabled. After a further short interval, corresponding to the range difference between the first two rings, amplifier 131 is blanked and amplifier 132 is enabled. The succession of pulses produced by computer 12 proceeds up the chain, enabling the amplifiers one at a time, in order. The signal from computer 11 is thus amplified by the stage corresponding to its proper ground range and printed by the proper ring of printer 15.

It is obvious that the production of undistorted maps by the instrument described above requires that the aircraft fly a reasonably level course in one direction and that it avoid errors in pitch, yaw, and roll, or that its antenna system be stabilized against rotation in inertial coordinates. The stabilization of the aircraft may be accomplished through the use of an autopilot of one of the types in current use, but experience in this art shows that it is difficult to prevent small motions of an aircraft due to air motions, even with a good autopilot. It is also possible to stabilize the antenna base against motion of the aircraft by a servomechanism which operates to correct the orientation of the antenna base through reference to a gyro or other instrument which determines small rotations. In the case of the radar antenna conceived in connection with this instrument, such a mounting is difficult to design and heavy and expensive to build. The antenna must be of large size and possess a large moment of inertia, so that a stabilization system which would keep it motionless with respect to the air frame in inertial coordinates with rapid response to error would have to be large and powerful to make the necessary corrections. It would also be necessary to make certain parts of the antenna stronger and make the mounting larger to provide for the necessary motion.

Consideration of Figure 3 will show the geometry for the correction problem and indicate the way in which it can be solved by inserting appropriate correcting signals in the computers and drive unit of the map printer to correct for small deviations of the aircraft from its assigned angles of flight. Axes 1A, 2A, and 7A of Figure 3 are an irrotational set of axes which travel with the aircraft. The aircraft is normally directed along axis 1A, and axis 2A is vertical. At the instant under discussion, however, the aircraft deviates from the axes by yaw angle $a$, pitch angle $b$, and roll angle $c$, which are taken as shown so that its momentary axes are 1A', 2A', and 7A'. In the uncorrected system, no notice could be taken of the deviation, and instead of path 4A' and printing the correct information as referred to terrain point 6A', the uncorrected system would print data taken from the terrain at 6A', as though it had been taken from position 6A and would thus introduce distortion into the map in range, azimuth and elevation. The correction system to be described below will work on the assumption that the angles $a$, $b$, and $c$ can be held down to a few degrees so that cross interaction terms may be ignored. In the rectangular coordinate system of the aircraft, the correction is difficult to compute, but a transformation to a coordinate system which rotates with the radar antenna simplifies the problem considerably.

The problem of correcting the printing computation so that the printed data corresponds to point 6A' instead of point 6A is that of computing angular correction $p$ and applying it to the drive unit of the printer, radius correction $q$, and altitude correction $m$ as shown on Figure 3. In terms of the roll, pitch, and yaw signals which may be derived from the aircraft autopilot system or from a pair of suitable gyroscopes, the transformed angles are given approximately by the following equations:

$$p = a + c \cos \phi - b \sin \phi \qquad 7$$
$$e = b \cos \phi + c \sin \phi \qquad 8$$

$p$ is the angle which must be added to $\phi$ to correct the printing position, and $e$ is the angle by which $\theta$ is reduced due to pitch and roll of the aircraft combined. Combination of these equations with those of the earlier sections gives $$\phi' = \phi + a + c \cos \phi - b \sin \phi \qquad 9$$
$$r' = R (\cos \theta + (b \cos \phi + c \sin \phi) \sin \theta) \qquad 10$$
$$A' = h - R (\sin \theta - (b \cos \phi + c \sin \phi) \cos \phi) \qquad 11$$

These equations may be verified easily by differentiation of the defining equations for $\phi$, $r$, and $A$ and substitution of the values given in Equations 7 and 8 for the differential angles.

Figure 4 shows some of the details of the computing arrangement for correcting the printing computers. Vertical gyroscope 191 may be a part of the aircraft autopilot, or it may be especially installed for the mapping equipment. It positions pickoff elements 192 and 193 so that they produce alternating voltages at some constant frequency of phase and magnitude characteristic of angle of roll $c$ and angle of pitch $b$. Directional gyroscope 194 is equipped with pickoff element 195 which gives an alternating voltage output which varies similarly with yaw angle $a$.

The outputs of pickoffs 192 and 193 are applied to the stator windings of resolvers 201 and 202 for the computation of the angular corrections. Radar antenna 101 is connected mechanically to resolvers 201 and 202 so that as it goes around in its search motion the rotors of the two resolvers revolve synchronously with it. The rotor windings of resolver 201 thus pick up a voltage proportional to $c \cos \phi - b \sin \phi$, and the windings of the rotor of resolver 202 pick up a voltage proportional to $b \cos \phi + c \sin \phi$. The output voltage of resolver 201 is added algebraically to the output voltage of pickoff element 195, which is proportional to $a$ to generate the complete correcting term for the angle $\phi$. Selsyn transformer 203 operates synchronously with the rotation of radar antenna 101. Selsyn differential generator 214 is positioned by servomotor 213 in accordance with the correction signal to add the correction angle to the output of selsyn 203 for transmission to mechanical drive unit 17. The correction signal, $p$ is used as an input voltage to servoamplifier 211 which drives servomotor 213 so that selsyn differential 214 is rotated to the correction angle, and followup unit 212 generates a signal equal and opposite to the correcting signal and so stops the servomotor.

When the correction system is used, the antenna 101 is driven by motor 102 of any desired type. This motor 102 drives selsyn transformer 203 which generates a three phase alternating current of a frequency that varies in a direct straight-line proportion to the speed of motor 102. The phase of that alternating current is modified by selsyn differential 214 as has been stated. The output of selsyn differential 214 drives motors 17 and 17A which in this case are selsyn motors.

Correction of the radius computation and the elevation computation for angular motion of the aircraft is carried out in radius computer 12 and in elevation computer 11 by varying the frequencies of the timing oscillators in these two units to take account of variations in the angle $\theta$. The output of resolver 202 is applied to attenuators 215 and 216. Attenuator 215 is adjusted to multiply the voltage by $\sin\theta$, and this correction voltage is applied to oscillator 123 of radius computer 12 to modify its frequency. As shown in equation 5 for the uncorrected case, the frequency of this oscillator is $$f = C \cos \theta / 2 \, dr \qquad 5$$

where C is the velocity of radar waves, and $dr$ is the smallest range difference to be distinguished. The effect of rotation of the aircraft which modifies $\theta$ is to change this frequency to $$f' = \frac{C}{2dr}(\cos\theta + \sin\theta(b\cos\phi + c\sin\phi)) \qquad 12$$

Oscillator 123 is a vacuum tube oscillator equipped with a reactance tube frequency modulator 2A25 or a servo operated variable condenser which changes the frequency linearly in accordance with the correction voltage selected above and thus corrects the radius computation. In order to control oscillator 123, the wire 215A of attenuator 215 (Fig. 4) is connected to wire 215A of oscillator 123 (see Fig. 6), with a suitable rectifier in between to convert the alternating voltage to a direct voltage.

The output of resolver 202 is modified in attenuator 216 by the cosine of $\theta$ and passed to the elevation computer, where it modifies the frequency of oscillator 112 in a manner similar to that outlined above for the radius computer. The frequency equation in this case is $$r' = \frac{C}{2dA}(\sin\theta - \cos\theta(b\cos\phi + c\sin\phi)) \qquad 13$$

where $dA$ is the smallest altitude interval, and the other symbols have the same meanings as before. In order to control oscillator 112, the wire 216A of attenuator 216 is connected to the wire 216A of oscillator 112 of Figure 7.

I hereinabove discussed a type of automatic printer for use with an airborne radar set which would prepare contour maps or other types of maps indicating the relative elevations of the terrain over which the aircraft flies. The following description outlines alternative forms of the same device, using some of the previous components, but providing for a considerable simplification in the overall equipment. In the previous form of invention the maps were printed directly on facsimile paper. In this one, they are deposited as a latent image on photographic film or paper which must be developed subsequently. Although the device described here does not produce immediately useful maps, it has the advantage of reduced size and weight. The stabilization provided in the other case may also be provided here.

Figure 5 illustrates the general connections among units. As in the previous case, radar set 10 generates pulses of high frequency electromagnetic radiation which are transmitted through antenna 101 along beam 4 to terrain element 6. The scattered and diffracted waves from terrain element 6 which return along beam 4 to antenna 101 are detected by the radar receiver, and the time of flight of the signal from antenna 101 to terrain element 6 and back is an indication of the distance to the element from the aircraft. The amplitude of the returned signal is an indication of the radar reflectance of the element under observation.

In this form of the device, drive unit 17C is used to move the mechanical parts of printers in synchronism with the antenna motion. It also moves a mechanical part 22a of elevation computer 22. Shaft 17C drives pinions 17D, 17E and 17F which respectively drive coil supports 17G and 17H and antenna 101. This new type of elevation computer and new types of printer 20 and 21 are substituted for printers 15 and 16, radius computer 12, and selectors 13 and 14 and elevation computer 11 of the previous form of invention. In operation, the trigger pulse from radar set 10, which originates at the time of pulse transmission from antenna 101 is sent on cable 102 to contour printer 20 and to elevation computer 22. The returned signal is sent on cable 103 to elevation computer 22 and to terrain echo printer 21. Altimeter 18 serves to correct elevation computer 22, and the output of this latter circuit is applied to contour printer 20 for the production of a contour map on the film.

The operations of printer 20 in producing a contour map in the film image will now be described. Unexposed film is drawn from supply roll 201 through the printer at a speed proportional to the aircraft ground speed by sprocket wheel 204, driven by motor 202. The exposed film is stored on take-up reel 203 after passing through the printer. The focused spot of electron current on the face of cathode ray tube 206 is caused to move radially by means of a fluctuating current in sweep generator 208 applied through deflecting coil 207. Deflecting coil 207 is turned mechanically to follow the motion of antenna 101 by drive unit 17C so that the radial trace on the face of cathode ray tube 206 follows the horizontal projection of radar beam 4. On the scale of the indicator tube, the spot is caused to sweep radially at a velocity equal to $$\frac{c \sin \theta}{2}$$

where $c$ is the velocity of light, and $\theta$ is the angle of depression of radar beam 4 below the horizontal.

The beam of electrons which excites the phosphor of the cathode ray tube is controlled in intensity by the signal from elevation computer 22 and the light from tube 206 is focused by lens 205 in such a way that identifiable contour lines, or other significant elevation marks are made on the film at appropriate scale positions to indicate the elevation of the terrain elements observed. The action of rotation deflection coil 207 and sweep generator 208 serve to locate the plotted points correctly in azimuth and in range, and the modulation from elevation computer 22 indicates the correct elevation data for the completion of the map.

Printer 21 is similar in every way to printer 20, and it derives its sweep voltage from sweep generator 208. The intensity of the electron spot in the cathode ray tube of printer 21 is controlled by the intensity of the returned echo signal from the terrain rather than from an elevation computer. Printer 21 thus produces a map which is identical in scale and in distortions with that produced by printer 20, but it contains terrain reflectance data rather than contour data.

I will now describe elevation computer 22. The trigger pulse from radar set 10 starts the action of delay circuit 228. This circuit introduces a delay period dependent on the reading of altimeter 18 and then triggers the operations of sweep generator 222, which produces a sawtooth waveform, pulling the spot of electron impact rapidly from top to bottom of cathode ray tube 221 and then permitting it to rise at a predetermined rate. The intensity grid of cathode ray tube 221 is activated by the returned echo signal from radar set 10. The electron current to the face of tube 221 is normally cut off, but when the echo signal from the terrain is received, a pulse of current is allowed to pass through tube 221, making a bright spot on the face. The position in which the spot is made is determined by the aircraft altimeter 18, operating through delay circuit 228 and the elevation of the terrain element from which the signal was reflected. The altimeter 18 is arranged so that echoes from terrain elements a given distance above the selected base level are always recorded at one position on the tube face, although the aircraft may fly at any desired altitude. The altitude return from the face of tube 221 is focussed by lens 223 onto code wheel 224. This wheel comprises a transparent disc with a series of concentric coded rings thereon. The ring having the smallest diameter is in line with the upper end of the trace on tube 221 and the ring having the largest diameter is in line with the lower end of the trace. Coding is accomplished by providing alternate opaque and transparent spots along the rings. Each ring is uniformly coded with different rings differently coded. For example the innermost ring is coded with long dashes and short spaces therebetween whereas the next ring is coded with short dashes and long spaces. The code wheel is rotated mechanically by drive unit 17C so as to remain in synchronism with the rotation of antenna 101. The light which passes through code wheel 224 is condensed by lens system 225 onto the cathode of photocell 226. The output signal of photocell 226 is amplified by amplifier 227 and passed to printer 20 for contour line printing, or other type of elevation indication. The nature of the printing signal and therefore the type of elevation indication given in printer 20 is determined by the manner in which light is allowed to pass through code wheel 224. Contour lines may be achieved without rotating the wheel by having a light screen with alternate sections opaque and transparent. If it is desired to identify the individual contour lines, the wheel may be rotated as indicated and each line may be interrupted in a way which will identify it. If it is desired to print the various elevations as variations of density, rather than as countour intervals, code wheel 224 may be replaced by a density screen whose density varies in the desired way from top to bottom to pass the desired amount of light through to photocell 226. If it is desired to print the map in a number of colors, wheel 224 may be replaced by a set of small lenses which will focus the light falling on them onto a number of separate photocells, each corresponding to a certain color in the printer. The printer may be loaded with color film, and three cathode ray tubes and lens systems similar to tube 206 and lens 205 may be used to provide the three basic colors necessary to printing colored bands to indicate certain elevation levels. Figure 9 shows the parts of elevation computer 22 and printer 20 which would be involved in a system of color printing.

As shown in Figure 9, elevation computer 22 uses cathode ray tube 221 to present the ground return signal in the same way in which it was used in the previous form. The altimeter correction and other features of the device are the same. In this form, however, there are three lens systems 223, passing light from the cathode ray tube through three separate transmission screens 224 through three separate condensing lenses 225 and to three photocells 226. Three amplifiers 227 pass the signals from the photocells to the three cathode ray tubes 206 of printer 20. Colors for printing in printer 20 are generated by the three color separation process well known to those skilled in color mixing, painting, or printing. The desired color on the film map to correspond to a particular elevation is formed by the mixing of light of three separate colors from cathode ray tubes 206A, 206B and 206C. The ratio in which the three colors are mixed to denote any particular elevation is determined by the ratios of light transmitted by corresponding steps of the three transmission screens in computer 22. For a given elevation, there is a given position of the reflected terrain spot on the face of cathode ray tube 221. This spot position corresponds to a given position on each of transmission screens 224, and the relative amounts of light received by photocells 226 are determined by the relative densities of screens 224. By appropriate choice of screens, it is possible to make any color range in the finished film correspond to any altitude range which is desired. Although the color system has some complications not present in the previous system, it has some advantages in that the map it produces is more immediately useful for some purposes.

The systems of Figures 5 and 9 as so far described are corrected for variations in altitude of the mapping aircraft but are not corrected for distortions in the map due to pitch, roll, or yaw of the aircraft. The correcting system described in the previous description can readily be applied to this system. In this case it will be necessary as before to provide corrected azimuth to drive unit 17C by means of the system shown in Figure 4 of the previous description. The outputs of the correcting system which served to correct radius and elevation operations are in this case applied to the sweep generators in the computers to modify the sweep rate in accord with the corrected depression angle of the radar beam. The radius correcting voltage would thus be used to modify the rate of sweep in sweep generator 208 and the elevation correction voltage would be used to modify the rate of sweep from sweep generator 222. According to the equations of operation of the system, the sweep rate required in sweep generator 222 is proportional to the sine of the depression angle of the radar beam below the horizontal plane. Figure 10 is a schematic diagram of a circuit which may be used in sweep generator 222 for the purpose of producing the sweep waveform required and for the purpose of correcting this sweep rate. It operates as follows. At the receipt of the synchronizing signal from delay circuit 228, condenser 2228 is momentarily charged by the signal in such a sense as to start the discharge of current in gas tube 2225. The current flowing in gas tube 2225 is limited by resistor 2226. The current serves to charge condenser 2224, and as the voltage on condenser 2224 approaches the supply voltage, the current diminishes, and the discharge in gas tube 2225 is extinguished. Once the discharge is extinguished, the high positive potential of the cathode with respect to the grid of tube 2225 serves to maintain the tube in a non-conducting condition until the discharge is once more initiated by the positive synchronizing pulse. As soon as condenser 2224 is charged to a positive potential, the charge starts to leak off through vacuum tube 2221. Tube 2221 is of the five electrode type and is so constructed that the current through the tube is dependent on the voltage between grid and cathode to a much greater extent than on the voltage between cathode and plate. In normal operation, the voltage from grid to cathode is provided by the voltage drop through resistor 2222 of the plate current of the tube. This has a stabilizing effect on the tube current and causes the tube to draw a constant current from condenser 2224 and thus to diminish the voltage across condenser 2224 at a constant rate and to produce a sweep voltage which varies linearly with time. The rate of this linear variation may be changed and corrected in this sweep circuit by the addition of an appropriate voltage in the grid circuit of tube 2221. In the corrected version of the computer, the computed change in the depression angle of the radar beam is multiplied by the cosine of the depression angle and applied as a voltage to the grid of tube 2221 to correct the rate of sweep of the electron spot on the face of cathode ray tube 221. A similar sweep generator is used in the radius presentation in printer 20.

It is understood in connection with Figure 5 that by suitable modification the contour printer 20 and the terrain printer 21 may be combined to print upon a single film. This can be done either by (a) using the two cathode ray tubes of the two systems arranged that they sweep the same trace upon the same film or (b) by omitting the terrain printer and adding its grid (still connected to wire 103) to cathode ray tube 206.

I claim to have invented:

1. In an airborne map printing system, radio means for detecting objects of terrain, means responsive to the output of said radio means to print a map of the objects of terrain, said last-named means including printing means for printing the map, additional means responsive to the output of the radio means for separately printing contour lines of the terrain, said additional means including printing means for printing contour lines, and means for synchronizing the two printing means so that contour lines as printed by the second printer are the contour lines of the terrain printed by the first printer.

2. In an airborne map printing system, means for making a map of the terrain adjacent the path of flight of the aircraft, means for simultaneously making an additional map of said terrain which consists of spaced continuous lines each of which lines represents an imaginary line on said terrain all of the points of which are at the same elevation, said last-named means including means for making its map to the same scale as the map produced by the first-named means, and means for synchronizing the operations of the first and second named means so that the lines on the second map are those applicable to and constituting contour lines of the terrain indicated on the first map.

3. In a radio detection system for aircraft; means for scanning the terrain in a predetermined manner comprising an airborne pulse modulated radio transmitter for radiating toward the ground, and receiving means for detecting return reflected waves of the carrier frequency of the transmitter; signal generating means responsive to the time difference between the outgoing and return waves for modifying its signal when such time difference conforms to one of several predetermined values; and indicating means synchronized with said scanning means and which when actuated produces indicia which conforms to the position being scanned by the scanning means at the instant of such actuation; said signal producing means including means to apply its signal output to said indicating means to actuate the same by the modifications of its signal output, the system including means for modulating the output of the signal generating means in different ways respectively when the said time difference conforms to different ones of said several predetermined values, said indicating means including means for giving different indications respectively in response to different modulations of the signal generating means, said system including in addition an altimeter for determining the absolute altitude of the aircraft and means responsive to variations of said altimeter for selecting said predetermined values according to the reading of said altimeter and includes means to provide large predetermined values when the aircraft is at a high level and lower predetermined values when the aircraft is at a low level, to thereby compensate for variations in the altitude of the aircraft.

4. In an airborne radio terrain map printing system, radio terrain scanning means including a pulse modulated radio transmitter and a receiver for receiving returned waves from the terrain, said scanning means including a rotating part for causing the scanning to take place in a circular path the center point of which path is directly below the aircraft, signal producing means responsive to the time difference between the outgoing and reflected pulses for modifying its signal output according to the duration of such time difference, said signal producing means including means for modifying its signal output only when such time difference conforms to one of a series of time difference values and also including means for producing different modulations of its signal output for different difference values of said series, printing means for forming distinctive indicia respectively in response to the different ones of said modulated signal outputs, means for moving the surface to be printed past said printing means at a speed proportional to the ground speed of the aircraft, and means for varying the angle at which printing is effected by the printing means synchronously with said rotating part.

5. In a system for printing contour lines, a cathode ray tube having a screen, a strip of photographic film exposed to the screen of said tube, means for moving said film parallel to the face of said screen at a speed proportional to the ground speed of the aircraft, a rotating directional antenna on said aircraft for directing signals toward and receiving signals from a confined spot of terrain, means for directing the antenna at a fixed angle to the vertical and for rotating the same in a circular path about a vertical axis, cathode ray deflecting means associated with said tube for rotating the beam of cathode rays synchronously with rotation of said antenna, radio transmitting and receiving means connected to the antenna for transmitting an outgoing pulse of radio frequency energy and receiving any return reflected pulse due thereto, a second cathode ray tube having deflecting means for deflecting its trace along a linear path, a saw-tooth sweep generator connected to the last-named deflecting means, control means responsive to transmitted pulses for starting the saw-tooth sweep of said sweep generator, said second tube having an intensity grid means for energizing said intensity grid by received reflected pulses, and light-responsive means responsive to the position of any intense spots on the trace of said second tube to intensity modulate the first tube, said last-named means including an intensity grid for the first tube and means for energizing the same only when intense spots appear on the screen of the first tube at predetermined points thereon.

6. The system of claim 5 in which said light responsive means comprises a series of different light transmitting elements located in front of the second tube and so that the light transmitted by that tube at different positions along the linear trace is affected in different ways, said light-responsive means also including means responsive to the light passed through said elements for controlling the intensity grid of the first grid to an extent distinctive of the way the light passing through said elements was affected thereby.

7. The system defined in claim 5 in which the light responsive means comprises the combination of a code wheel and a light-sensitive cell, said code wheel having a plurality of concentric rings each of which rings has a different series of distinctive markings, said rings being spaced from each other and located immediately in front of said linear trace so that the radius of the code wheel is parallel to and adjacent the linear trace and so that any light spots on the trace will be concentrated upon a part of the radius of the code wheel, said cell being responsive to light transmitted from the cell through the code wheel, the cell output being connected to control the intensity grid of said first tube, and means for rotating said code wheel.

8. The system defined in claim 5 in which the control means is a delay circuit which starts the saw-tooth sweep only after a time interval following the transmission of the outgoing pulse, and an altimeter for varying the delay effected by the delay circuit to increase the delay when the aircraft is ascending and to decrease the delay when the aircraft is descending.

9. In an airborne device for printing different contour lines in different colors, a plurality of cathode ray tubes each having means cooperating therewith to produce a different color than those produced by the others, a strip of photographic color film exposed to all of said tubes so that spots of light in complementary places on the several tubes will coincide on the film, means for moving said film relative to said tubes at a speed proportional to the ground speed of the aircraft, a rotating directional antenna on the aircraft for directing signals toward and receiving signals from a confined spot of terrain, means for directing the antenna at a fixed angle to the vertical and for rotating the same in a circular path about a vertical axis, cathode ray deflecting means associated with each of said tubes, means for rotating each of said cathode ray deflecting means in synchronism with rotation of said antenna, radio transmitting and receiving means connected to said antenna for transmitting an outgoing pulse of radio frequency energy and receiving any reflected return pulses, a saw-tooth sweep generator connected to said deflecting means, means responsive to each outgoing pulse to trigger the saw-tooth sweep generator into operation, another cathode ray tube having a deflecting element for moving the trace thereof along a predetermined path, a saw-tooth sweep generator for energizing the last-named deflecting element, means responsive to each outgoing pulse to trigger the last-named sweep generator, said other cathode ray tube including an intensity grid, means to energize said intensity grid by return pulses, a plurality of light screens one for each of said plurality of cathode ray tubes, said light screens being respectively mounted in paths of light leaving said other cathode ray tube and varying in transparency along the same separate light-sensitive cells respectively responsive to the respective light rays passing through said screens, each of said plurality of cathode ray tubes having an intensity grid, and means respectively connecting said cells to said last-named intensity grids.

10. Apparatus for printing elements of terrain in colors with the color of printing depending on the altitude of the terrain comprising elevation-responsive means for detecting the elevation of the terrain and producing spaced pulses the spacing of which varies with the altitude of the terrain, a plurality of signal producing devices which produce signal outputs which vary as said spacings vary, said signal producing devices including means varying their signal outputs according to different mathematical laws as the said spacing varies, a plurality of light producing means for respectively producing light rays of different colors, there being one of said light producing means for each signal producing device and each light producing means including means for varying the intensity of the light output therefrom according to variations in the output signal of its complementary signal producing device, means for moving the light output of the light producing means to positions corresponding to the position of the terrain being examined by the elevation-responsive means, a strip of color film, and means for condensing the light outputs from the plurality of light producing means onto the film with the light outputs of all of the light producing means always forming coincident spots on the film.

11. In a system for printing contour lines, a rotating directional antenna, a radio transmitter feeding its output to said antenna, a radio receiver receiving waves intercepting the antenna, a pulser for modulating the transmitter, delay circuit energized by the pulser, first oscillator actuated by the output of the delay circuit which begins its oscillations when so actuated, a plurality of elements respectively energized by successive pulses from the oscillator, a second oscillator, means connected to the pulser for starting the second oscillator to oscillate, a coincidence circuit responsive to the output of the second oscillator and also responsive to the output of said receiver to pass a pulse when concurrently energized by the second oscillator and the receiver, modulating means for modulating the output of the coincidence circuit, said modulating means including means to vary the amplitude of its output depending on the number of pulses produced by the second oscillator, a plurality of mixer circuits one for each of said elements, each mixer circuit including means for passing a signal when it is concurrently energized by its complementary element and by the modulating means, a plurality of concentric conducting rings insulated from each other, a sheet of chemically treated paper which changes its color when electric current flows therethrough, means for moving said sheet across the edges of said rings, an electrode pressing on the side of the paper opposite that which touches said rings, and means for rotating said antenna and said electrode synchronously with the electrode rotating about the center of curvature of said concentric rings, said delay circuit and said first oscillator having such interrelationship that the output pulses from the oscillator will occur at times which are respectively proportional to the several radii of the concentric rings.

12. In an airborne terrain elevation determining system, an altimeter for determining the absolute altitude of the aircraft above a base plane of known altitude which plane is at an altitude different from that of said terrain, radio means for determining the vertical height of the aircraft above the terrain, and means responsive to the difference in the determinations of the absolute altimeter and the radio means for indicating the altitude of the terrain.

13. In an airborne terrain elevation determining system, radio means for determining the distance from the aircraft to the terrain along a line which is at an acute angle to a vertical axis that passes through the aircraft, altitude indicating means responsive to the output of the radio means, means to compensate the altitude indicating means for the error introduced due to the angle of measurement of the distance so that it indicates the altitude of the aircraft above the terrain, altitude determining means for determining the altitude of the aircraft above a known datum plane, and means for modifying the indicating means according to the output of the altitude determining means, said indicating means including means responsive to the altitude determining means and the radio means for indicating the altitude of the terrain.

14. In an airborne map printing system, radio means for detecting objects of terrain, means responsive to the output of said radio means to print a map of the objects of terrain, said last-named means including printing means for printing the map, additional means responsive to the output of the radio means for separately printing indicia indicative of the contour of the terrain, said additional means including printing means for printing said indicia, and means for synchronizing the two printing means.

15. A map printing system comprising a printer; said printer comprising a plurality of concentric conducting rings which are insulated from each other, means for moving one face of a sheet of material on which printing is to be effected across the face of said concentric rings, and a printing element pivoted for rotation about the axis of said rings and movable relative to the other face of said sheet; a plurality of coincidence circuits, one for each of said rings and connected to its complementary ring; each coincidence circuit including two inputs and including means for modulating the current to its complementary ring in response to concurrent predetermined states of the two inputs; a radio pulse detection system comprising a pulse modulated transmitter and a receiver; means for feeding the output of the receiver to one of the inputs of each of the coincidence circuits; and means synchronized with outgoing pulses of said transmitter for thereafter sequentially varying the energizations of the remaining inputs of said coincidence circuits; said transmitter including a rotatable antenna; and means for synchronously rotating said antenna and printing element.

16. A map printing system comprising a plurality of concentric rings composed of conducting material and insulated from each other, means for moving one face of a sheet of material across one face of said rings, a rotatable conducting printing element pivoted coaxial with said rings and movable across the other face of said sheet, a plurality of coincidence circuits one for each ring, each coincidence circuit including two input circuits and means responsive to predetermined concurrent energizations of said inputs for passing a current from the coincidence circuit to its complementary ring then through said sheet and to said printing element, a pulse modulated transmitter and a complementary receiver, said transmitter and receiver including rotatable antenna means, means for synchronously rotating said antenna means and said printing element, means for feeding the output of said receiver to one of the inputs of each of the coincidence circuits, and a circuit for energizing the other inputs of the coincidence circuits sequentially between transmitted pulses.

17. An airborne map printer as defined in claim 16 in which said means for moving the sheet of material includes means for moving the material at a speed proportional to the ground speed of the aircraft.

18. An airborne map printer as defined in claim 17 in which the means for feeding the output of said receiver to one of the inputs of each of the coincidence circuits comprises elevation computing means which passes received impulses only when they occur at one of a series of predetermined time displacements away from the transmission of an outgoing pulse.

19. A map indicating system comprising indicating means having a plurality of discrete elements which elements are respectively capable of producing indications at successive points, a plurality of coincidence circuits one for each of said elements, each coincidence circuit including two inputs and also means for controlling its complementary element to give an indication in response to the occurrence of predetermined states on its two inputs, a pulsed transmitter, a receiver for reflected waves that originated at said transmitter, means feeding the output of said receiver to one input of each of said coincidence circuits, and means for sequentially energizing the other inputs of said coincidence circuits between outgoing pulses.

20. An airborne map printing system for printing both a map of the terrain and a contour map comprising in combination a pulse modulated transmitter, a receiver for receiving waves from said transmitter reflected by the terrain, an antenna for the transmitter and receiver, a plurality of concentric rings composed of conducting material and insulated from each other, means for moving one face of a sheet of material across one face of said rings, a rotatable printer of conducting material movable across the other face of said sheet, a second plurality of concentric rings composed of conducting material and insulated from each other, second means for moving one face of a second sheet of material across one face of the second plurality of rings, a second rotatable printer of conducting material movable across the other face of the second sheet of material, means for synchronously rotating the antenna and said printers, a coincidence circuit for each ring, each coincidence circuit including two inputs and means responsive to concurrent energization of the two inputs for passing current from the coincidence circuit to the complementary ring then through the sheet in contact with the ring and then to the printer touching the sheet, means for energizing one of the inputs of each of the coincidence circuits associated with the first plurality of rings whenever a pulse is received on said receiver, means for energizing one of the inputs of each of the coincidence circuits associated with the second plurality of rings whenever a pulse is received at the receiver at any of a series of equally spaced time intervals following the transmission of a pulse, and means for sequentially energizing the remaining inputs of the first as well as of the second group of coincidence circuits following each transmitted pulse with spaced time intervals between successive energizations of a different and shorter order than the first-named time intervals.

21. The system of claim 12 in which the radio means comprises a pulse echo system including a receiver for receiving echo pulses; the indicating means comprising means to indicate the time displacement between outgoing and return pulses and including means operated by the absolute altimeter to reduce the indicated time displacement of echo pulses as compared to outgoing pulses as the absolute altitude of the aircraft increases.

RICHARD C. RAYMOND.

References Cited in the file of this patent

UNITED STATES PATENTS

| Number | Name | Date |
|---|---|---|
| 2,253,292 | Goldsmith | Aug. 19, 1941 |
| 2,323,534 | Goddard | July 6, 1943 |
| 2,335,180 | Goldsmith | Nov. 23, 1943 |
| 2,403,562 | Smith | July 9, 1946 |
| 2,406,316 | Blumlein | Aug. 27, 1946 |
| 2,407,198 | Wolff | Sept. 3, 1946 |
| 2,407,898 | Norgaard | Sept. 17, 1946 |
| 2,412,669 | Bedford | Dec. 17, 1946 |
| 2,416,088 | Deerhake | Feb. 18, 1947 |
| 2,417,033 | Wolff | Mar. 4, 1947 |
| 2,421,018 | De Rosa | May 27, 1947 |
| 2,427,220 | Luck | Sept. 9, 1947 |
| 2,430,283 | Epstein | Nov. 4, 1947 |
| 2,455,673 | Hansell | Dec. 7, 1948 |
| 2,456,952 | Kluender | Dec. 21, 1948 |
| 2,467,202 | Gardiner | Apr. 12, 1949 |
| 2,491,276 | Mitchell | Dec. 13, 1949 |
| 2,492,120 | Smith | Dec. 20, 1949 |
| 2,522,528 | McNally | Sept. 19, 1950 |
| 2,523,858 | Bodemüller | Sept. 26, 1950 |
| 2,526,682 | Mulberger | Oct. 24, 1950 |
| 2,532,549 | Higinbotham | Dec. 5, 1950 |
| 2,534,820 | Hurvitz | Dec. 19, 1950 |
| 2,535,048 | Deloraine | Dec. 26, 1950 |
| 2,539,553 | Rich | Jan. 30, 1951 |
| 2,542,825 | Mesa | Feb. 20, 1951 |
| 2,549,072 | Epstein | Apr. 17, 1951 |
| 2,554,893 | Brunn | May 29, 1951 |
| 2,561,345 | Deloraine | July 24, 1951 |
| 2,616,077 | Holser | Oct. 28, 1952 |